United States Patent
Sharpe

(10) Patent No.: US 8,272,221 B2
(45) Date of Patent: Sep. 25, 2012

(54) HYDROGEN GAS GENERATOR FOR JET ENGINES

(76) Inventor: Thomas H. Sharpe, North Augusta, SC (US)

( * ) Notice: Subject to any disclaimer, the term of this patent is extended or adjusted under 35 U.S.C. 154(b) by 0 days.

(21) Appl. No.: 13/155,144

(22) Filed: Jun. 7, 2011

(65) Prior Publication Data
US 2012/0047872 A1 Mar. 1, 2012

Related U.S. Application Data

(63) Continuation-in-part of application No. 13/036,888, filed on Feb. 28, 2011, which is a continuation-in-part of application No. 12/458,548, filed on Jul. 15, 2009, now abandoned, which is a continuation of application No. 12/219,805, filed on Jul. 29, 2008, now Pat. No. 7,563,418.

(60) Provisional application No. 60/996,780, filed on Dec. 5, 2007.

(51) Int. Cl.
 *F02C 6/18* (2006.01)
(52) U.S. Cl. .......................... 60/780; 422/199
(58) Field of Classification Search .............. 60/775, 60/780; 422/199, 236; 423/657, 658; 204/272
See application file for complete search history.

(56) References Cited

U.S. PATENT DOCUMENTS

| | | | |
|---|---|---|---|
| 2,502,332 A | 3/1950 | McCollum | |
| 2,920,445 A | 1/1960 | Bailey | |
| 2,920,448 A | 1/1960 | Coanda | |
| 3,291,705 A * | 12/1966 | Hersch | ............ 205/783 |
| 3,323,304 A | 6/1967 | Llobet et al. | |
| 3,517,510 A | 6/1970 | Melenric | |
| 3,630,879 A * | 12/1971 | Spacil | ............ 204/248 |
| 3,680,317 A | 8/1972 | Kotoc | |
| 3,800,531 A | 4/1974 | Sharpe | |
| 4,148,701 A * | 4/1979 | Leach | ........... 204/157.5 |
| 4,371,500 A * | 2/1983 | Papineau | ........... 422/115 |
| 4,821,512 A | 4/1989 | Guile et al. | |
| 5,189,875 A | 3/1993 | Melenric | |
| 5,417,057 A | 5/1995 | Robey | |
| 6,790,324 B2 * | 9/2004 | Chambers | ............ 204/242 |
| 6,981,366 B2 | 1/2006 | Sharpe | |
| 7,563,418 B2 | 7/2009 | Sharpe | |
| 2002/0121079 A1 | 9/2002 | Schierbaum | |
| 2004/0006965 A1 | 1/2004 | Schierbaum | |

\* cited by examiner

*Primary Examiner* — Phutthiwat Wongwian
(74) *Attorney, Agent, or Firm* — Richard C. Litman

(57) ABSTRACT

The hydrogen gas generator for jet engines includes a device that utilizes photons and a catalyst to disassociate hydrogen gas from water. The generated hydrogen gas is directed to the combustion chamber of a jet engine and combined with air therein for burning and powering the jet engine. The device is connected to a source of electric energy and pressurized water. The electric energy is supplied to an anode and a surrounding cathode. The cathode is designed to glow white-hot and emit photons and heat when an electric current is supplied thereto. The anode is fabricated from a catalytic material and is designed to become red-hot when supplied with electric energy. Water is supplied through a conduit and is converted to superheated steam, which is thermolytically decomposed to form hydrogen and oxygen.

13 Claims, 4 Drawing Sheets

HYDROGEN GAS GENERATOR FOR JET ENGINES

CROSS-REFERENCE TO RELATED APPLICATIONS

This application is a continuation-in-part of U.S. patent application Ser. No. 13/036,888, filed Feb. 28, 2011, which is a continuation-in-part of U.S. patent application Ser. No. 12/458,548, filed Jul. 15, 2009, now abandoned which is a continuation of U.S. patent application Ser. No. 12/219,805, filed Jul. 29, 2008, now U.S. Pat. No. 7,563,418, issued Jul. 21, 2009, which claimed the benefit of U.S. provisional patent application Ser. No. 60/996,780, filed Dec. 5, 2007.

BACKGROUND OF THE INVENTION

1. Field of the Invention

The present invention relates to jet engines, and more specifically, to a hydrogen gas generator for jet engines that may be used, e.g., in a self-starting turbineless jet engine.

2. Description of the Related Art

While jet engines employing turbines have received both long-term and widespread adoption for both commercial and military aviation applications, other jet engines, such as ramjet engines with no internal moving parts beyond their fuel delivery systems, have not seen widespread adoption. Note that as used herein, the term "ramjet" is taken to including sub-sonic, sonic and supersonic RAM jet engines unless designated otherwise.

A ramjet uses its own forward motion to compress incoming air without a turbine or other rotary compressor. When a ramjet is moving at sufficiently high speed through air, the physical configuration of the ramjet creates a high-pressure region in front of the engine and a corresponding low pressure region to the rear of the engine, leading to a large pressure differential. This large pressure differential forces air into a tube within the ramjet where internal constraints on airflow cause the air to be compressed. The compressed air is ultimately combusted with fuel and released to the rear of the engine to provide thrust. A variety of liquid and solid fuels can be used as long as those fuels combust sufficiently well to maintain the necessary airspeed for continuous ramjet operation.

Modern materials, manufacturing techniques and design simulations have reached a level of sophistication sufficient to produce workable ramjet engines. Furthermore, ramjets can outperform turbine-based jet engine designs at certain supersonic speeds and are more fuel efficient than rockets over much of their working range. The performance of ramjet engines exceeds that of turbine-based jet engines, in part because the extreme temperatures and pressures associated with supersonic travel place severe demands on rotating turbine blades, while ramjets do not have turbines or comparable moving internal parts. However, current ramjet engines have other limitations that do not exist with turbine-based jet engines.

A typical ramjet design relies upon the internal pressure differential produced by a shockwave developed within the engine as air passes from supersonic to subsonic flow. This is achieved by carefully shaped and contoured surfaces within the engine, which accelerate and decelerate the airflow as desired. The result is an engine that is capable of producing useful amounts of thrust at high speed, including supersonic speeds, with no moving parts. However, current ramjet engines are severely limited because they cannot produce thrust at zero airspeed, and thus cannot move an aircraft from a standstill. As a result, ramjet engines require some other form of propulsion to provide the requisite minimum air velocity for operation. Because the other form of propulsion incurs its own costs and issues, ramjets have not been seen as practical for many civilian and military applications. There is a need for a turbineless jet engine that can produce thrust from a standstill so that no additional form of propulsion is required. Thus, a self-starting turbineless jet engine solving the aforementioned problems is desired.

SUMMARY OF THE INVENTION

The self-starting turbineless jet engine provides inlet louvers that direct air through an internal restriction before mixing it with a fuel for combustion in a combustion chamber. While most of the combustion gases are exhausted through an outlet portion of the turbineless jet engine, a portion of the combustion gases are mixed with air received from an aft inlet duct. A combustion chamber is disposed radially around a center axis of the turbineless jet engine and feeds a relatively small portion of the combustion gases back through a centrally located hot gas and fire pressure conduit where the combustion gases from the combustion chamber are combined and redirected by a high temperature insulated nose cone back to the aft side of the inlet louvers. By having a separate path for a small portion of the combustion gases and a large portion of unburned air to be reintroduced back into the combustion chamber, the turbineless jet engine can provide heat and air compression to produce thrust, even at zero airspeed.

The self-starting turbineless jet engine is not limited to any one particular fuel. In some embodiments, fuel is provided by hydrogen, which may be provided by the Hydrogen Generator for Jet Engines, as disclosed in my prior U.S. Pat. No. 7,563,418, issued Jul. 21, 2009. In some other embodiments, a different fuel delivery device vaporizes a liquid hydrocarbon fuel for combustion. The liquid hydrocarbon fuel can be jet fuel, such as Jet A, Jet A-1, Jet B, etc.

While the primary airflow paths in the engine contain no moving parts, the fuel delivery mechanism uses a fuel pump air motor. The fuel pump air motor is operated by exhaust gas from the combustion section of the engine once the engine is in operation, thereby eliminating the need for electrical and/or other power for the engine in some embodiments, except during start-up.

These and other advantages of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The self-starting turbineless jet engine produces thrust from a fuel source using no internal moving parts, except for the fuel delivery system. Compared to more commonplace turbine-based jet engines, there are no compressors or other rotating machinery inside the jet engine.

Figure 1:
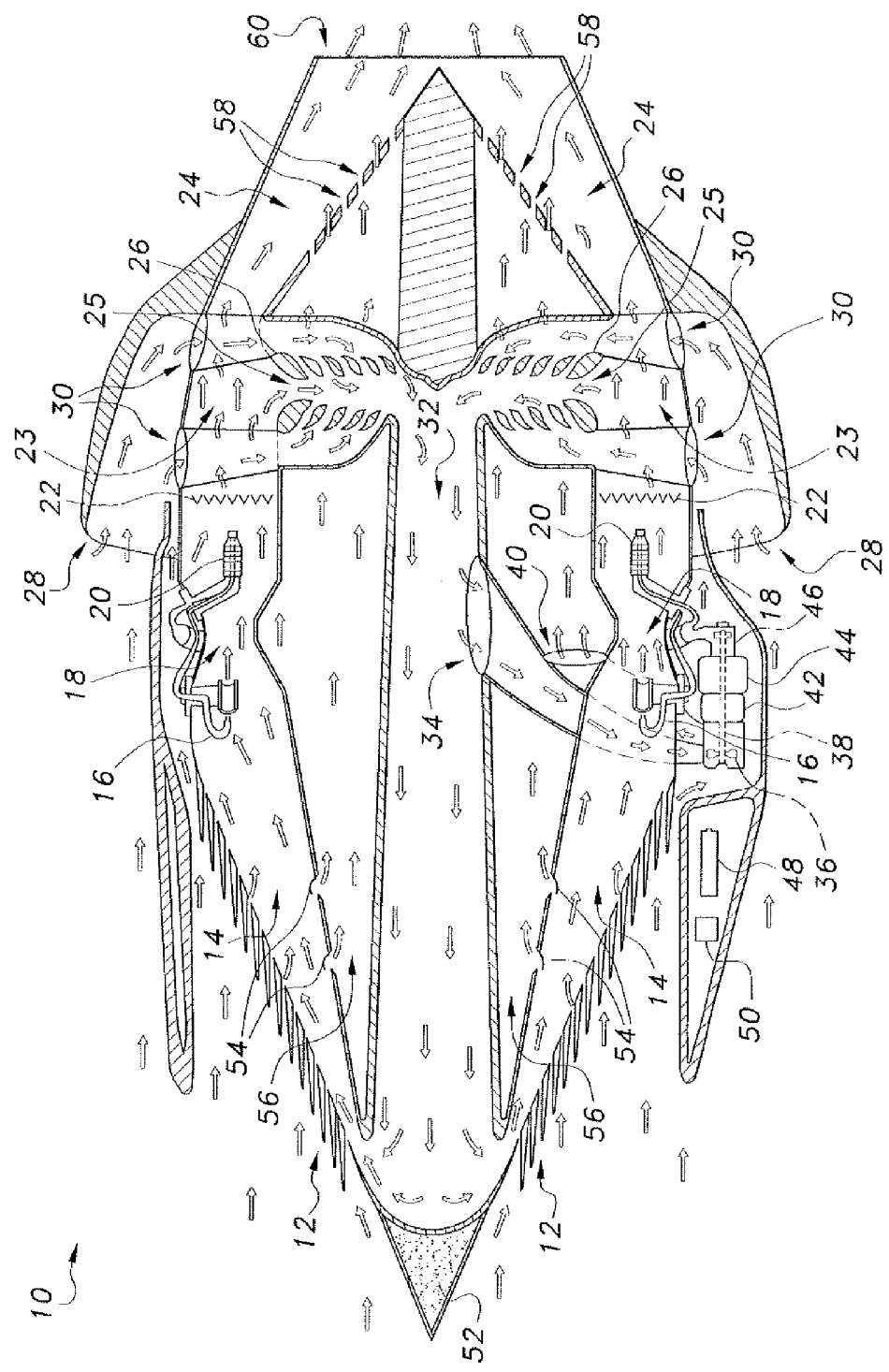
FIG. 1 is a diagrammatic side view in section of a self-starting turbineless jet engine according to the present invention.
Figure 2:
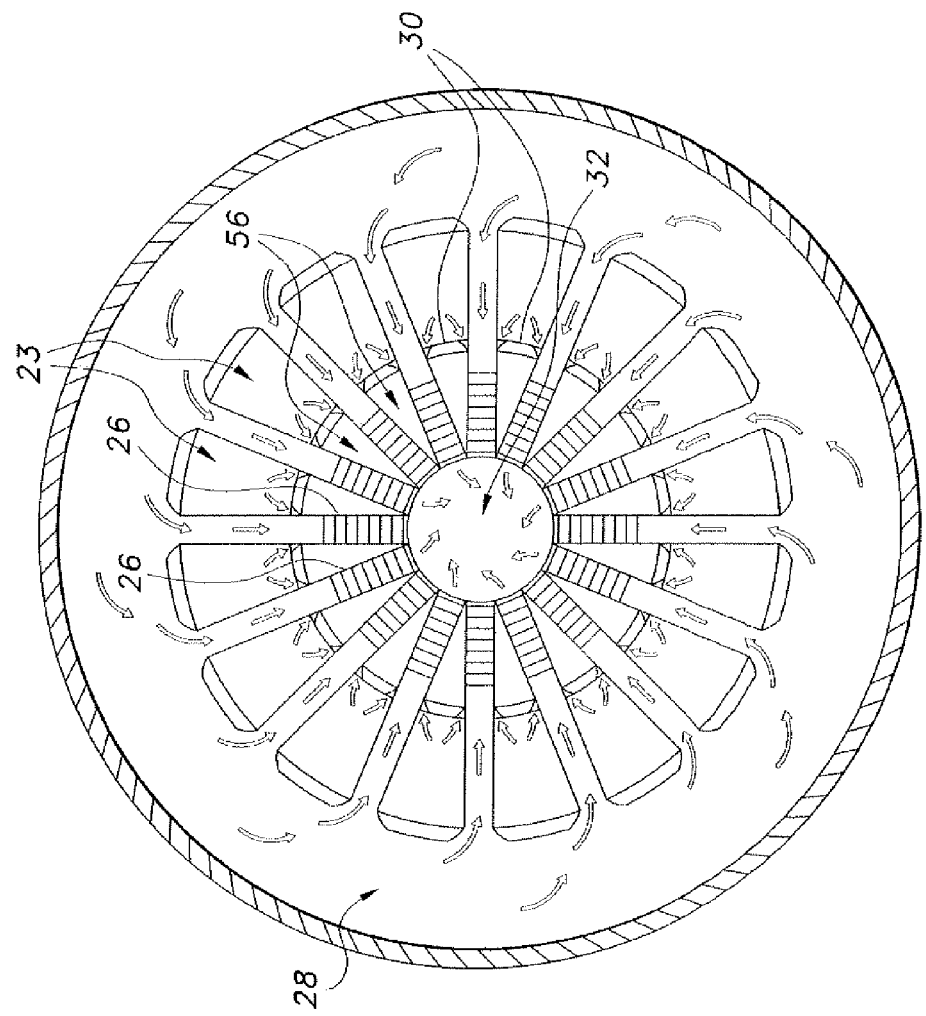
FIG. 2 is a front view in section of a self-starting turbineless jet engine according to the present invention, taken approximately through a thermodynamic heat exchanger portion of the engine.

FIG. 1 of the drawings provides a side view in section, largely diagrammatic, of the self-starting turbineless jet engine 10 according to some preferred embodiments of the present invention. While the view of FIG. 1 only shows two separate combustion areas, oriented one above the other and with their associated inlets and outlets, as shown in FIG. 2, in preferred embodiments there is a single combustion chamber positioned radially around a central axis of the jet engine 10.

The jet engine 10 of FIG. 1 includes fourteen louvered air inlets 12 disposed radially around a central axis of the jet engine 10 for receiving air from outside of the jet engine 10. Note that one or more jet engines 10 may be physically coupled to an aircraft, rocket, projectile or other airborne object. The louvered air inlets 12 receive outside air in the path illustrated in FIG. 1, as traveling in a left to right direction relative to the jet engine 10. For illustration purposes, the forward facing portions of the jet engine 10 face predominantly left, while the rearward facing portions of the jet engine 10 face predominantly right.

The air inlet section 14 also receives a portion of the exhaust gases, as described below, to pass aft of the louvers 12 at high speed to pump air into the air inlet section, so that the air is heated and further compressed within the air inlet section 14. Air in the air inlet section 14 passes a starter high temperature steam injector 16 before reaching an air inlet constriction portion 18. The starter high temperature steam injector 16 injects high temperature steam, which undergoes rapid expansion, in order to force more air through the air inlet constriction portion when the jet engine is being started. The steam injector 16 is only needed in startup conditions. The steam injector 16 is under control of a central processor unit (CPU) 50 so that once the jet engine 10 reaches sufficient power, the steam injector is no longer used. Air is accelerated through the air inlet constriction portion 18 because of the reduced opening. Air that has passed through the air inlet constriction portion 18 encounters uncombusted fuel from a nozzle 20. In some preferred embodiments, the fuel released from the nozzle 20 is hydrogen.

The hydrogen emitting nozzle 20 is fully described in the inventor's prior U.S. Pat. No. 7,563,418, issued Jul. 21, 2009, which is hereby incorporated by reference in its entirety, i.e., the nozzle 20 comprises the hydrogen generator described in the aforementioned patent. Briefly stated, the nozzle 20 or hydrogen generator includes a tungsten screen cathode disposed around an anode made from carbon steel, iron, nickel and chromium. The anode is, in turn, disposed around a pipe that delivers steam. When current is applied to the anode and the cathode, the anode and cathode are heated until they become white-hot, which superheats the steam. The superheated steam is sprayed into the space between the anode and cathode, and is thermolytically converted to ionized oxygen and hydrogen. The ionized hydrogen is attracted by the negatively charged cathode, and passes through the cathode to the combustion chamber. It will be understood, however, that other sources of hydrogen fuel may be provided and injected into the combustion chambers through suitable nozzles. The hydrogen generator of the '418 patent is preferred because the anode and cathode become white-hot during the process of generating hydrogen, which heats the air-fuel mixture in the jet engine 10, leading to more complete combustion of the air-fuel mixture in the combustion chambers, with greater resultant thrust.

In other embodiments, the fuel is a hydrocarbon-based jet fuel, such as Jet A, Jet A-1, Jet B, or other commercially available jet fuel, etc. When the fuel used is a hydrocarbon-based jet fuel, the nozzle 20 will be of a type well known in the art.

Fuel injected from the nozzle 20 is mixed into the incoming air to create an air-fuel mixture and is combusted. A flame holder 22 is used to slow a portion of the air-fuel mixture to provide more consistent combustion ignition, occurring, in part, in a combustion chamber 23 area. While combustion occurs in the combustion chamber 23, it is not limited to the combustion chamber 23. Most combustion gases from the combustion chamber 23 are exhausted through an air outlet section 24 without any further travel within the jet engine 10. However, some of the combusting air-fuel mixture is redirected towards a central horizontal axis of the jet engine into a thermodynamic air compressor 25 that contains venturis 26. The venturis 26 compress the combusting air-fuel mixture and further allow the introduction of outside air into the jet engine 10 via an aft inlet duct 28 (shown at the top and bottom in FIG. 1) disposed radially around the jet engine 10.

The aft inlet duct 28 represents a second point of entry into the jet engine 10 for outside air, the first being the louvered air inlets 12. Air received by each of the aft inlet ducts 28 is divided and forced into thirty-two (32) corresponding aft inlet heat exchanger inlet pipes 30 that pass air to the venturis 26, where the air passes between the venturis 26 into the combusting air-fuel mixture. The insertion of outside air at this point provides additional oxygen and pressure, which helps to force the combusting air-fuel mixture into a central hot gas and fire pressure conduit 32. Air passing through all sixteen groups of venturis 26 disposed radially around the central axis of the jet engine 10 is forced into the central hot gas and fire pressure conduit 32, where the flow is redirected towards the forward facing portions of the jet engine 10.

A small portion of the gases in the central hot gas and fire pressure conduit 32 is diverted into an air motor inlet duct 34, where it is used to interact with an air motor 36 to rotate a fuel pump shaft 38. After the small portion of the gases from the central hot gas and fire pressure conduit 32 interact with the air motor 36, they are exhausted through an air motor outlet duct 40. The fuel pump shaft 38 turns a constant speed drive (CSD) 42 of a type known in the art. The CSD 42, in turn, drives an electrical motor-generator 44 and a fuel pump 46. The electrical motor-generator can receive and consume electrical energy from a set of batteries 48 under control of the CPU 50 in order to turn the fuel pump shaft 38, or can be turned by the fuel pump shaft 38 to generate electrical energy. In either case, the fuel pump shaft 38 is turning, which causes the fuel pump 46 to deliver fuel to the nozzle 20.

Most of the gases in the central hot gas and fire pressure conduit 32 continue past the air motor inlet duct 34 in a forward direction, generally opposite to the direction of the air entering the engine through the louvered air inlets 12, until encountering a high temperature insulated nose cone 52. The gases in the central hot gas and fire pressure conduit 32 are deflected by the nose cone 52 back into the air inlet section 14, where they quickly pass aft of the louvers 12 and effectively pump air into the inlet section 14 of the jet engine 10 to be heated and compressed.

The jet engine 10 also contains air pathways for cooling purposes. A small amount of air is removed from the air inlet section 14 inside the jet engine 10 via cooling air inlets 54. Air passes from the air inlet section 14 through the cooling air inlets 54 into a cooling air conduit 56. Air inside the cooling air conduit 56 cools outer surfaces of the central hot gas and fire pressure conduit 32 and the thermodynamic air compressor 25 before passing through outlet gaps 58 into the air outlet section 24, and are vented back into the atmosphere through exhaust aperture 60 in the air outlet section 24. Air exhausted through the air motor outlet duct 40 is also exhausted into the cooling air conduit 56.

FIG. 2 shows a front view in section taken approximately through the thermodynamic heat exchanger 25. From this view, one can see a front portion of the sixteen venturis 26 disposed radially around the central hot gas and fire pressure conduit 32 in the jet engine 10. Between the venturis 26 are the sixteen cooling air conduits 56. Extending radially past the cooling air conduits 56 are front portions of the thirty-two aft inlet heat exchanger inlet pipes 30 that pass air to the sixteen venturis 26, which are located to the sides and behind the leading or frontmost portions of the aft inlet heat exchanger inlet pipes 30. The combustion chamber 23 is positioned radially adjacent to the front portions of the aft inlet heat exchanger inlet pipes 30. Finally, outside air is received by the aft inlet duct 28, and follows the path indicated by the arrows in FIG. 2.

With regard to both FIG. 1 and FIG. 2 and from an airflow perspective in start-up, the CPU 50 uses electrical power from the batteries 48 to power the electrical motor-generator 44 and a fuel pump 46. If the fuel is hydrogen, the CPU 50 also directs electrical power from the batteries 48 to four nozzles 20 to photodissociate the water into hydrogen and oxygen in order to start the engine 10. Alternatively, if the fuel is a hydrocarbon-based fuel, all twelve hydrocarbon spray nozzles 20 can be operated simultaneously, as desired. The CPU 50 also provides electrical power for the hot steam injectors 16 to begin airflow in the jet engine 10. If the fuel is hydrogen, the high temperature hydrogen produced in the nozzle 20 will be ignited upon contact with oxygen in the air. If the fuel is a hydrocarbon, a separate igniter of the conventional type (not shown) is used to ignite the fuel.

Regardless of fuel type, fuel mixes with air, and the resultant air-fuel mixture is combusted in the combustion chamber 23 (and elsewhere) with assistance of the flame holder 22. In some embodiments, roughly 80 to 85% percent of the air-fuel mixture is combusted and leaves the jet engine 10 directly through the air outlet section 24 to produce thrust, while the remaining 15-20% is diverted through the venturis 26 in the thermodynamic air compressor 25 and driven into the central hot gas and fire pressure conduit 32 in the jet engine 10. Hot gases in the central hot gas and fire pressure conduit 32 encounter the high temperature insulated nose cone 52, and are redirected back into the air inlet section 14 before returning to the high temperature steam injector 16 and passing into the air inlet constriction portion 18.

Thrust produced by the jet engine 10 will eventually accelerate the engine and produce increasing levels of compressed air received by the louvered air inlets 12 and the aft inlet duct 28 for use in the jet engine 10. In typical circumstances, the jet engine 10 will reach desired operating conditions, including speed and thrust. As the jet engine 10 accelerates towards the desired operating conditions, the CPU 50 can correspondingly reduce the amount of electrical energy provided by the batteries 48 and rely instead on electrical energy generated by the electrical motor-generator 44.

Figure 3:
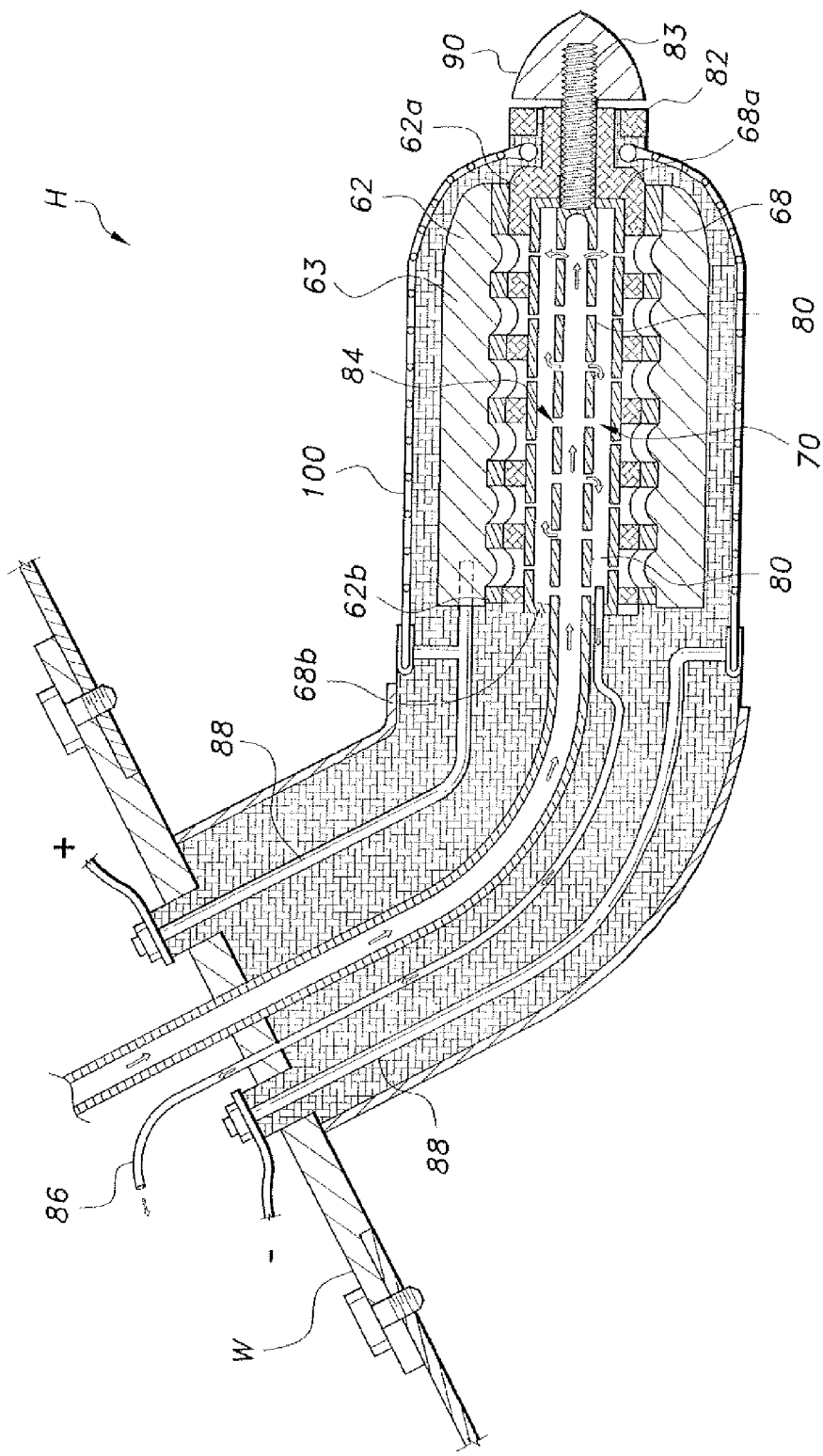
FIG. 3 is a partial sectional view of an alternative embodiment of a hydrogen gas generator for jet engines according to the present invention.
Figure 4:
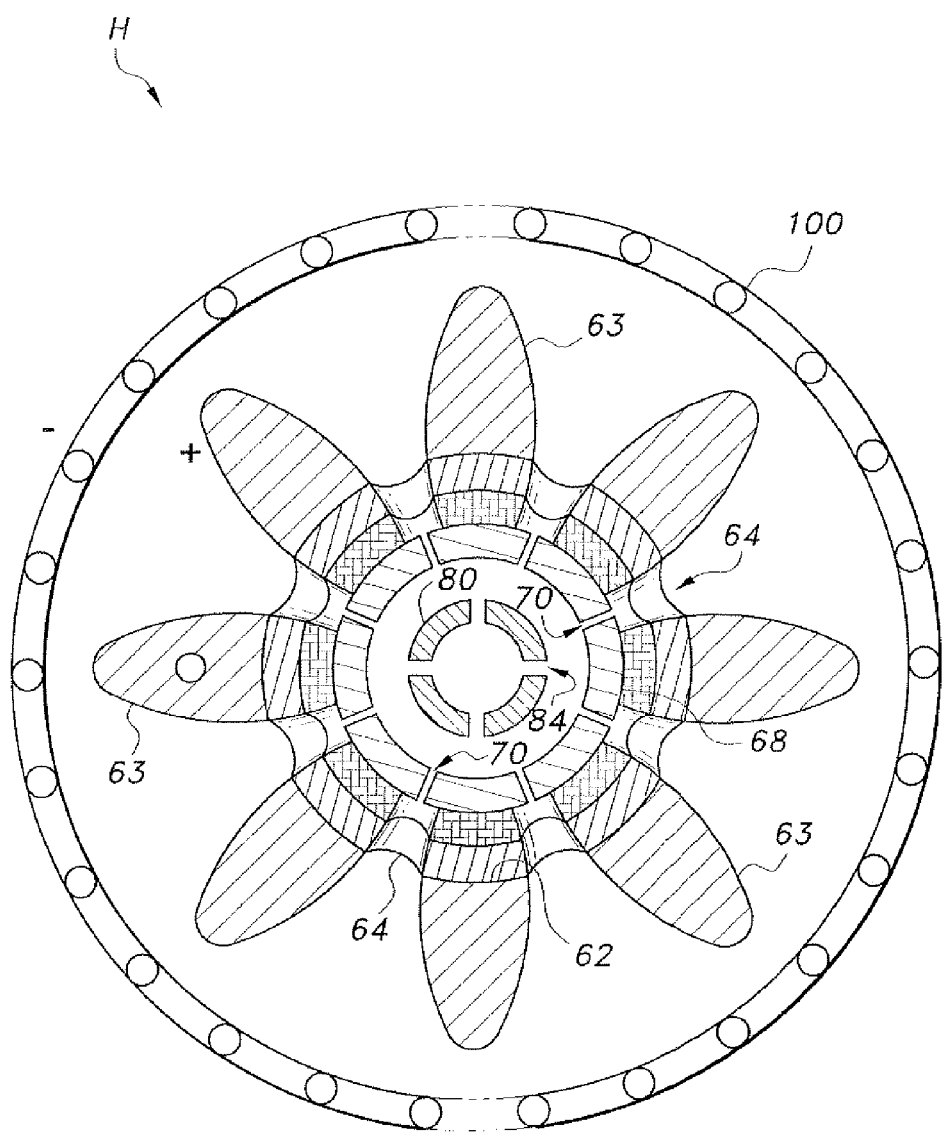
FIG. 4 is an end view in section of the hydrogen gas generator of FIG. 3.

FIGS. 3 and 4 show a second embodiment of the hydrogen gas generator nozzle 20 as described above and disclosed in U.S. Pat. No. 7,563,418, issued Jul. 21, 2009. The hydrogen generator of FIGS. 3 and 4 is generally indicated at H. Hydrogen generator H comprises a plurality of concentrically arranged, spaced members (62, 68, 80) encapsulated within a tungsten screen assembly 100. The screen assembly 100 is identical to the tungsten screen assembly disclosed in U.S. Pat. No. 7,563,418. The outer member 62 is provided with a plurality of radially extending spokes 63. The spokes 63 are coextensive with the length of the outer member 62. The outer member 62 is provided with an open proximate end 62a and a closed distal end 62b. Openings 64 are formed through the wall of the outer member 62 adjacent each respective spoke 63. The outer member 62 is fabricated from an alloy of carbon steel, iron, nickel and chromium.

A second tubular member 68 is concentrically disposed within the outer member 62. The tubular member 68 has a closed end at 68a adjacent the open proximate end 62a of the outer member 62. The opposite end 68b of the tubular member 68 is open to receive a pipe 80 concentrically spaced therein. Openings 70 are spaced along the length of the tubular member 68. The pipe 80 extends from outside the combustion chamber wall W and terminates in an externally threaded end 83. The portion of the pipe 80 positioned within the tubular member 68 is provided with openings 84 spaced along the length of the walls thereof. The portion of the pipe 80 positioned outside of the tubular member 68 is imperforate. The pipe 80 is connected to a source of pressurized water. A starter conduit 86 for supplying superheated steam on start-up is in fluid communication with the space between the pipe 80 and the tubular member 68.

Ceramic insulators 82 are utilized to close and seal the spaces between the outer member 62 and the tubular member 68. Electric current is provided to the outer member 62 and the tungsten screen assembly 100 via copper wires 88. A nut 90 assembled to a threaded stud 83 extending from the closed end 68a of the tubular member 68 permits the generator H to be easily disassembled for maintenance.

In use, electric energy is supplied to the generator H via copper wires 88. The polarity of the wires 88 is arranged so that the outer member 62 functions as an anode and the tungsten screen assembly 100 functions as a cathode. The anode, or outer member 62, because of its metallic content, also functions as a catalyst when heated. The cathode, or tungsten screen assembly 100, becomes white-hot when supplied with electrical energy and emits photons and generates heat. Pressurized water is supplied to the generator H through the pipe 80 (note the direction of arrows in FIG. 3). The anode, or outer member 62, becomes red-hot, and heat generated by the anode converts the water to superheated steam as it flows through openings 64. The spokes 63 provide an increased surface area to enhance the conversion.

The superheated steam is thermolytically converted to hydrogen and oxygen. The photons emitted by the cathode (tungsten screen assembly 100) convert the hydrogen and oxygen gases into positively charged hydrogen ions and negatively charged oxygen ions in the space between the anode (outer member 62) and the cathode (tungsten screen assembly 100). The outer member 62 (anode) is a positive electrode that functions to attract and remove the oxygen ions from the mixture, and may be made from a catalytic material to increase efficiency of the electrode. The hydrogen gas flows through the white-hot screen assembly 100 into the combustion chamber. The hydrogen gases burn white-hot in the combustion chamber, producing more photons and heat, allowing reduction of the electrical current to the cathode (tungsten screen assembly 100). Conventional controls, including valves and timers, may be provided to control operation of the device.

In conclusion, the self-starting turbineless jet engine, in its various embodiments, provides a practical alternative to current ramjet designs because of its self-starting capability. Furthermore, the lack of moving or rotating parts, outside of fuel delivery, greatly reduces the manufacturing costs and labor associated with current turbine-based jet engines. The engine 10 has the ability to operate without the need for external electrical power once it has been sufficiently started. The hydrogen gas fuel generator provides an efficient and cost-reducing means for supplying fuel to the engine.

It is to be understood that the present invention is not limited to the embodiments described above, but encompasses any and all embodiments within the scope of the following claims.

I claim:

1. A hydrogen gas generator for jet engines, comprising:
   an anode having a length, an inner surface, an outer surface, and a plurality of openings formed through the anode, the openings extending from the inner surface to the outer surface;
   a plurality of spokes formed on the outer surface of the anode and extending radially outward therefrom;
   a cathode screen filament disposed around the anode and defining a space therebetween, the anode and the cathode being adapted for mounting in a combustion chamber of a jet engine;
   a tubular member concentrically positioned within the anode, the tubular member having a length, a closed first end, an open second end, and a plurality of openings therein spaced along the length of the tubular member;
   a pipe extending into the tubular member and concentrically spaced therefrom to define a space between the pipe and the tubular member, the pipe being adapted to deliver pressurized water into the tubular member, the pressurized water flowing through the plurality of openings spaced along the length of the tubular member and into the plurality of openings in the anode; and
   means for supplying sufficient electrical current to the anode to heat the pressurized water to produce superheated steam.

2. The hydrogen gas generator for jet engines according to claim 1, further including means for supplying sufficient electrical current to said cathode to thermolytically produce hydrogen and oxygen gases from the superheated steam, and to produce photons to ionize the hydrogen and oxygen gases.

3. The hydrogen gas generator for jet engines according to claim 1, wherein said anode has an open proximate end and a closed distal end.

4. The hydrogen gas generator for jet engines according to claim 1, wherein said anode is fabricated from a metal alloy of carbon steel, iron, nickel and chromium.

5. The hydrogen gas generator for jet engines according to claim 1, wherein said cathode is fabricated from strands of tungsten.

6. A hydrogen gas generator for jet engines, comprising:
   an anode having a length, an inner surface, an outer surface, an open proximate end, and a closed distal end;
   a plurality of spokes formed on the outer surface of the anode and extending radially outward therefrom, the spokes having a length coextensive with the length of the anode, the anode having a plurality of openings formed therein, the openings being positioned adjacent the spokes and extending from the inner surface to the outer surface of the anode;
   a cathode screen filament disposed around the anode and defining a space therebetween, the anode and the cathode being adapted for mounting in a combustion chamber of a jet engine;
   a tubular member concentrically positioned within the anode, the tubular member having a length, a closed first end, an open second end, and a plurality of openings therein spaced along the length of the tubular member;
   an elongate pipe extending into the tubular member and concentrically spaced therefrom to define a space between the pipe and the tubular member;
   a plurality of nozzles formed in the pipe for delivering pressurized water into the space formed between the pipe and the tubular member, the pressurized water flowing through the plurality of openings spaced along the length of the tubular member and into the plurality of openings in the anode; and
   means for supplying sufficient electrical current to the anode to heat the pressurized water to produce superheated steam.

7. The hydrogen gas generator for jet engines according to claim 6, wherein said plurality of nozzles are spaced along the length of said elongate pipe.

8. The hydrogen gas generator for jet engines according to claim 6, further including means for supplying sufficient electrical current to said cathode to thermolytically produce hydrogen and oxygen gases from the superheated steam, and to produce photons to ionize the hydrogen and oxygen gases.

9. The hydrogen gas generator for jet engines according to claim 6, wherein said anode is fabricated from a metal alloy of carbon steel, iron, nickel and chromium.

10. The hydrogen gas generator for jet engines according to claim 6, wherein said cathode is fabricated from strands of tungsten.

11. A hydrogen gas generator for jet engines, comprising:
    an anode fabricated from a metal alloy of carbon steel, iron, nickel and chromium, the anode having a length, an inner surface, an outer surface, an open proximate end, and a closed distal end;
    a plurality of spokes formed on the outer surface of the anode and extending radially outward therefrom, the spokes having a length coextensive with the length of the anode, the anode having a plurality of openings formed therein, the openings being positioned adjacent the spokes and extending from the inner surface to the outer surface of the anode;
    a ceramic insulator closing the open proximate end of the anode;
    a cathode screen filament fabricated from strands of tungsten, the cathode screen filament being disposed around the anode and defining a space therebetween, the anode and the cathode being adapted for mounting in a combustion chamber of a jet engine;
    a tubular member concentrically positioned within the anode, the tubular member having a length, a closed first end, an open second end, and a plurality of openings therein spaced along the length of the tubular member;
    a pipe extending into the tubular member and concentrically spaced therefrom to define a space between the pipe and the tubular member;
    a plurality of nozzles formed in the pipe for delivering pressurized water into the space formed between the pipe and the tubular member, the pressurized water flowing through the openings spaced along the length of the tubular member and into the plurality of openings in the anode, the pressurized water being converted to superheated steam as it flows through the openings in the anode; and
    means for supplying sufficient electrical current to the anode to heat the pressurized water to produce superheated steam.

12. The hydrogen gas generator for jet engines according to claim 11, wherein the closed end of said tubular member is positioned adjacent the proximate end of said anode.

13. The hydrogen gas generator for jet engines according to claim 12, further including means for supplying sufficient electrical current to said cathode to thermolytically produce hydrogen and oxygen gases from the superheated steam, and to produce photons to ionize the hydrogen and oxygen gases.

\* \* \* \* \*